April 1, 1969 P. FRENCH 3,436,571
DYNAMOELECTRIC MACHINE HAVING CORRESPONDING FERROMAGNETIC
COILS ON ALTERNATING ROTOR AND STATOR DISKS
Filed March 13, 1967 Sheet 1 of 2
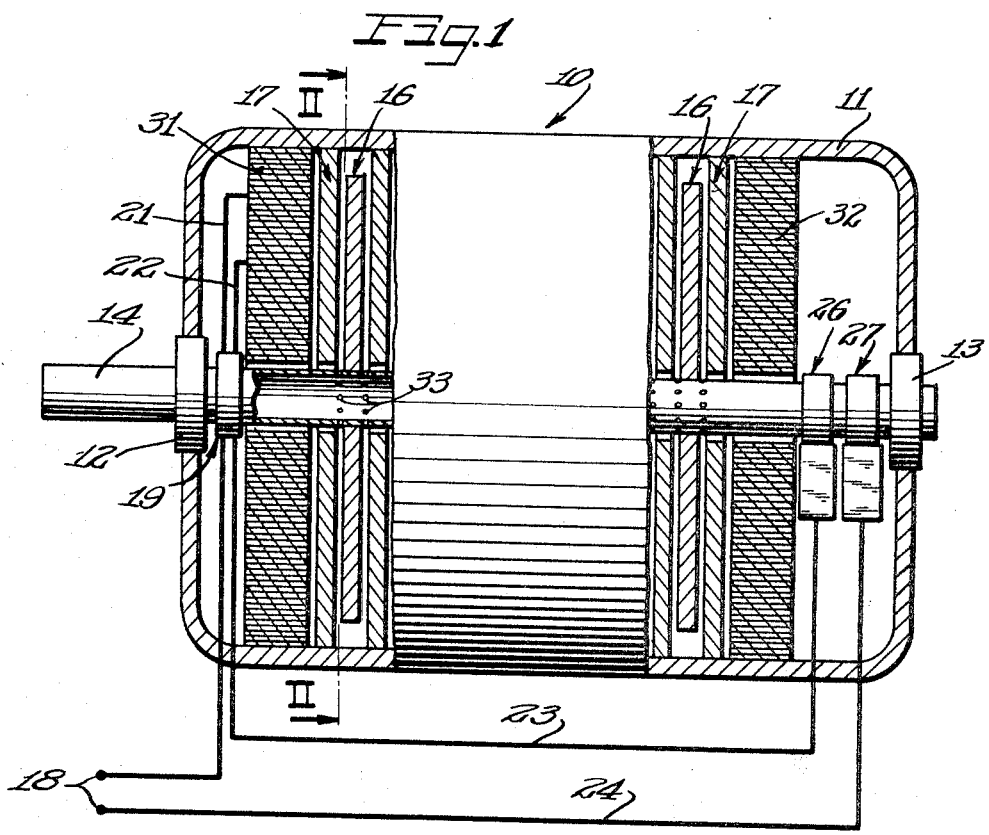
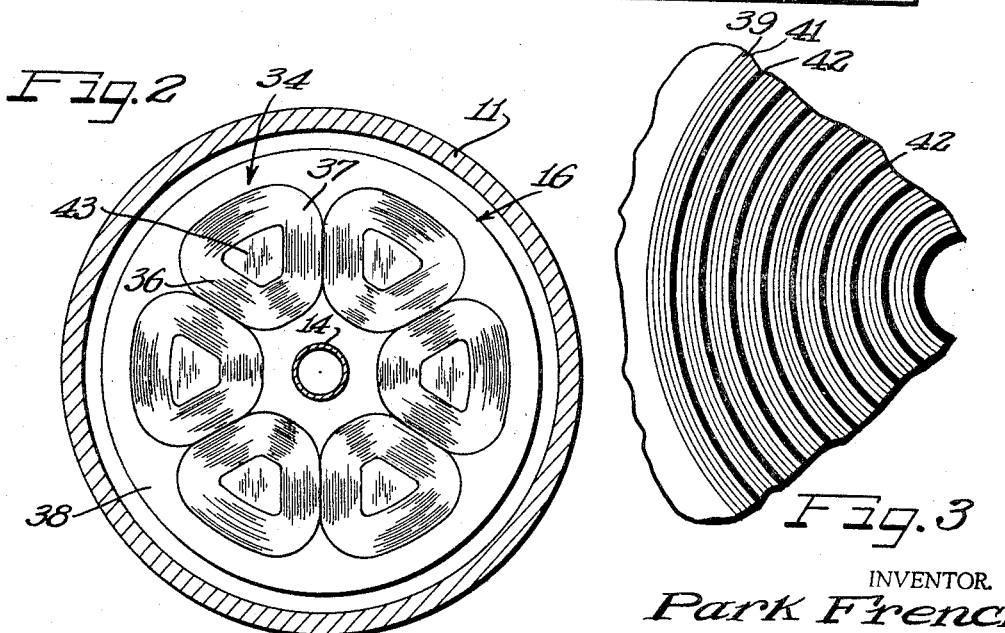
INVENTOR.
Park French
BY
ATTORNEYS

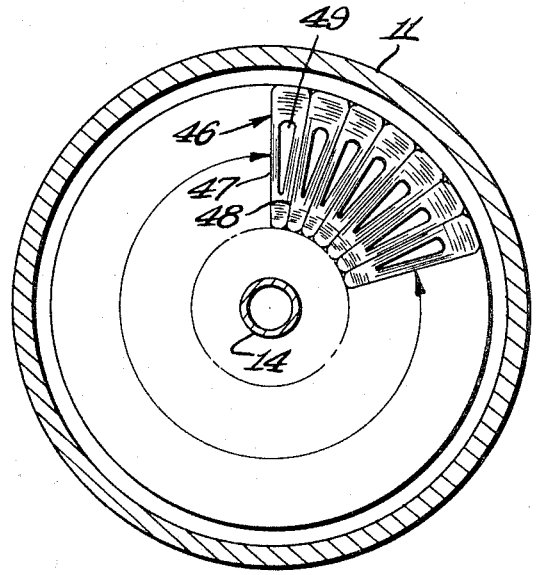
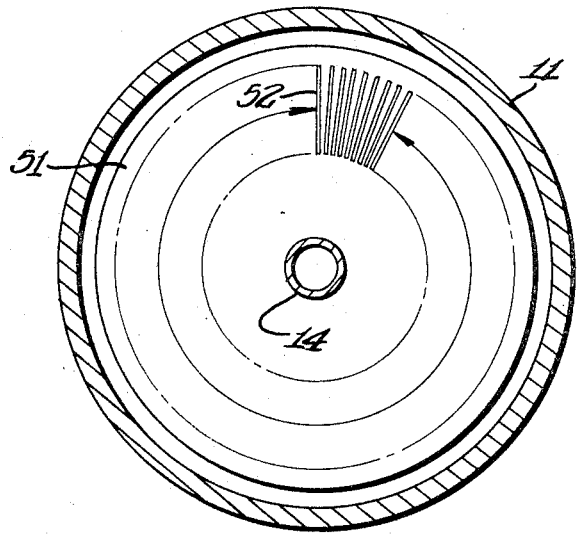

United States Patent Office 3,436,571
Patented Apr. 1, 1969

3,436,571
DYNAMOELECTRIC MACHINE HAVING CORRESPONDING FERROMAGNETIC COILS ON ALTERNATING ROTOR AND STATOR DISKS
Park French, Aurora, Ohio, assignor to TRW Inc., Cleveland, Ohio, a corporation of Ohio
Continuation-in-part of application Ser. No. 341,643, Jan. 31, 1964. This application Mar. 13, 1967, Ser. No. 642,981
Int. Cl. H02k 37/00
U.S. Cl. 310—46
10 Claims

ABSTRACT OF THE DISCLOSURE

Dynamoelectric machines of the disk type wherein the rotor and stator disks contain coils preferably formed of alternating strips of ferromagnetic material and electrically conductive, nonmagnetic material.

CROSS REFERENCES TO RELATED APPLICATIONS

This application is a continuation-in-part of my co-pending application Ser. No. 341,643 filed Jan. 31, 1964, now abandoned, and represents an improvement primarily from the standpoint of mechanical structure over the types of machines disclosed in my application, Ser. No. 384,733 filed July 23, 1964, now abandoned.

BACKGROUND OF THE INVENTION

Field of the invention

The invention is in the field of dynamoelectric machines of the disk rotor and disk stator type. The machines may be A.C. or D.C., and depending upon the mode of energization and coil geometry, can operate as motors or generators of the single-phase or multiphase type.

DESCRIPTION OF THE PRIOR ART

Previously designed machines of the disk type usually used more or less conventional coil windings in their rotor and stator configurations. Such machines required rather close manufacturing tolerances and close spacing between the rotor and stator pairs. What is more, such machines frequently did not produce smooth stator coil voltage waveforms and when used as A.C. machines, required intricately designed coil shapes. Machines of the past frequently were quite expensive to manufacture particularly in the matter of coils for the rotor and stator.

SUMMARY OF THE INVENTION

The present invention is particularly concerned with an improved means for incorporating ferromagnetic materials in the magnetic flux path of dynamoelectric machines. It is particularly directed to disk element dynamoelectric machines and provides a condition of virtually constant reluctance in the magnetic flux paths. With the improvements of the present invention, the design and construction of high efficiency multiphase and commutated machines are rendered relatively simple and economical. Another advantage arises from the reduction of effective air gap reluctances in the machine, permitting the use of relatively large air gaps between the rotor and stator elements. With the stator and rotor constructions of the present invention, the gap flux densities are reduced relative to the flux densities in the magnetic strips of the rotor and stator by virtue of the spacing between these strips. This feature also permits the free flow of cooling fluid between the elements and reduces mechanical tolerances somewhat. By the design of the present invention, the development of proper waveforms is facilitated.

The machines of the present invention include a rotary shaft on which one or more rotor disks are mounted in spaced relation. A plurality of stator disks are provided in interleaved relation with the rotor disks along the length of the shaft. Both the rotor disks and the stator disk have circumferentially spaced coils therein, the coil design in both the rotor and stator disks in most cases being identical. Individual coils of both the rotor and stator assemblies are axially aligned with corresponding coils in adjacent rotor and stator disks, respectively, the coils in each axial array being wound in the same direction so that the magnetic lines of flux passing through a given axial array of coils are continuous, thereby in effect, forming a series of long solenoids. The coils in one axial array are wound opposite to the coils in the next adjacent axial array.

In the preferred form of the invention, the rotor coils and stator coils are provided in the form of thin, flat ribbons of both a ferromagnetic material, such as iron, and a nonmagnetic electrically conductive material, such as copper. The two types of strips are wound together as a laminate, the width of the strips being substantially the same as the thickness, i.e., the axial dimension of the disk itself. The two abutting ribbons may be conveniently wound on a typical coil forming machine. Insulation means are provided between selected turns of the completed coil, allowing the iron to carry a fraction of the coil current.

The core of the coils in both the rotor and stator are left without windings. Instead, it is preferable that this space be filled with a magnetically permeable material having a permeability such that the mean permeability of the core in the axial direction is substantially equal to the mean permeability of the coil in the axial direction. This structural feature contributes to the attainment of the constant reluctance feature characteristic of the machine. The result of the use of the improved coil structures is a marked increase in average flux density per unit of field current, and a consequent increase in efficiency.

Further improvements in the efficiency are obtained by minimizing the field solenoid end losses by providing a low reluctance flux path between adjacent solenoid ends. This is preferably accomplished by spirally winding a large open centered coil from an electrically insulated magnetic strip and employing the resulting coil as end pieces in the machine.

BRIEF DESCRIPTION OF THE DRAWINGS

FIGURE 1 is a view in elevation, partly broken away to illustrate the construction of a motor embodying the principles of the present invention;

FIGURE 2 is a cross sectional view taken substantially along the lines II—II of FIGURE 1;

FIGURE 3 is a fragmentary enlarged view of a portion of the corner of a rotor coil assembly illustrating the lamination thereof;

FIGURE 4 is a vertical cross sectionnal view similar to FIGURE 3 of another modified form of the invention which is particularly applicable for large machines, the rotor portion being shown in elevation; and FIGURE 5 is a vertical cross sectional view of a modified rotor or stator structure suitable for use in an induction motor.

DESCRIPTION OF THE PREFERRED EMBODIMENTS

In FIGURE 1, reference numeral 10 indicates generally a motor involving the principals of the present invention, the motor 10 including a frame 11 having a pair of oppositely disposed bearings 12 and 13 in which a rotary shaft 15 is journaled. A plurality of rotor elements 16 is secured in spaced relation along the length of the shaft 14 in interleaved relationship with a series of stator disks 17 secured to the frame 11. The stator is supplied with current from a pair of terminals 18 by means of a switching mechanism which is illustrated schematically at reference numeral 19 in the drawings. The type of commutation which will be employed will vary with the nature of the machine, and may consist of mechanical commutation devices or, in the usual case, will consist of a solid state inverter which supplies current to the stator in the correct time and phase relationship for the particular machine involved. Conductors 21 and 22 deliver the output of the switching mechanism 19 to the windings of the stator disks 17. Another pair of conductors 23 and 24 apply a D.C. source appearing across terminals 18 and the switching circuitry 19 to the rotor disks 16 by means of a pair of slip rings 26 and 27 associated with the shaft 14.

A pair of ferromagnetic end plates 31 and 32 are disposed at opposite sides of the rotor-stator disk pairs. These end plates 31 and 32 are preferably made by spirally winding a strip of ferromagnetic material such as iron. The use of end pieces of this type has been found to reduce the end path reluctances to very low values.

As seen in FIGURE 1, the shaft 14 is hollow and is provided with a series of circumferentially spaced apertures 33 by means of which cooling air can be introduced into the gaps between the rotor disks 16 and the stator disks 17. Ordinarily, the natural circulation of the air through these passages is sufficient to cool the motor, but in particularly high current carrying assemblies, it may be desirable to introduce air under pressure into the apertures 33.

The structure of the individual rotor disks 16 is best illustrated at FIGURES 2 and 3 of the drawings. It will be understood, of course, that the structure of the coils in the stator disks can be and usually is identical to those of the rotor disks.

The specific form of the invention in FIGURE 2 comprises six rotor segments or coils 34 but it should be recognized that any even number of coils can be used in the disks, depending upon the circuit parameters.

The individual coils 34 are of generally trapezoidal shape including converging, generally radially extending side leg portions 36 and 37. The coils 34 are constructed as a laminate of a ferromagnetic strip material and a nonmagnetic electrically conductive strip of substantially the same width, the width of the superposed strips being the same as the thickness or axial dimension of the body 38 in which the coils 34 are embedded. As illustrated in FIGURE 3, the coils may consist of an alternating series of iron strips 39 and copper strips 41 in direct contact so that the iron carries a portion of the current. Insulation is provided by insulating strips 42 consisting of a dielectric material which separates one or more pairs of convolutions of the iron-copper strips. The insulating strips 42 need not be of appreciable thickness, and could constitute an insulating coating on the surface of the copper strip, for example.

For greatest effectiveness in reducing the gap reluctance, the distance between the ferromagnetic laminae should be at most as large as the gap spacing between the rotor element 16 and the stator element 17. The use of thin laminae and conductors perpendicular to the flux direction suppresses eddy currents and their associated losses. In machines using the type of coil structure shown, the E.M.F. per turn divided by the resistance per turn increases monotonically (in one direction) from the inside to the outside of the coil. Accordingly, the inner windings contribute less to the efficiency of the machine than do the outer windings. The inner windings thus consume power resistively rather than add significant amounts of usable power. Accordingly, the coils are arranged such that the windings do not extend to the center and instead, a core 43 is included in each coil, the core consisting of a permeable material of medium permeability or so. The permeability of the core is chosen so that the core has a means permeability in the axial direction which is substantially the same as the permeability of the coil in the axial direction. The core material, for example, can be composed of alternating laminations of a nonpermeable material and the same ferromagnetic material used in the coil. Alternatively, the core 43 can consist of a permeable material such as a ferrite.

The behavior of the machines of the present invention varies with the ratio of iron to conductor in the coils. When the fraction of iron is very small, high efficiencies are obtained, but iron saturation occurs at low power levels. As the fraction of iron increases, the power levels permissible from a saturation standpoint increase very rapidly, since they vary as the square of the iron fraction. However, the rotor and stator resistances are also increased due to the smaller conductor cross sections, thereby increasing the rotor and stator losses and lowering the efficiency. In many cases, this increased dissipation places a power limitation on the machines which is determined by their cooling ability. Maximum power output is obtained by adjusting the iron fraction so that the saturation power limit coincides with the cooling limit.

The structure shown in FIGURE 2 is particularly suitable for relatively small machines in which the rotor is operated as a D.C. element. While this type of configuration can be very efficient for larger machines, the saturation power density limit decreases with increasing scale, so that large machines using these coil configurations have poorer power to weight ratios than small machines.

When the coil configuration, shown in FIGURE 2, is utilized in A.C. machines, it is advantageous from the standpoint of the power handled by the rotor slip-rings that the rotor be polarized with D.C. current and that A.C. power be supplied to or removed from the stator disk coils, depending upon whether the machine is operating as a motor or generator. In this circumstance, the rotor coils 34 in each rotor disk should be aligned axially with corresponding coils in all rotor disks. The electrical connections between the coils should be made so that the coils of any axially aligned group reinforce each other, forming the equivalent of solenoids. Adjacent solenoids are polarized in opposite directions, so that the rotor field produced by the coil array, shown in FIGURE 2 of the drawings, consists of six regions of axial flux. Each region is associated with a coil position as shown in the figure, and the flux direction reverses as one passes from one region to the next.

For multiphase machines, the stator disks may be arranged in a number of groups, the number equaling the number of electrical phases. The coils in each group are aligned with respect to each other as in the case of a single-phase machine, but the groups are displaced angularly from each other as is appropriate for the various phases. The stator disks associated with each particular phase may be distributed axially along the machine in any convenient manner. Alternatively, the appropriate coils for a multiphase machine can all be included in each stator disk by building up the stator disks from several layers of coils, each layer corresponding to a phase. This type of construction is best suited to two-phase machinery, since larger numbers of phases and coil layers would result in poor heat transfer from the inner coil layers.

An alternative form of coil configuration which can be used in large machines to permit high power density is shown in FIGURE 4. The rotor of this machine employs a series of coils 46 of generally elongated but still trapezoidal form, and including radially extending leg portions 47 and 48. As in the previously described embodiments, the centers of the coils 46, identified at reference numeral 49, may be filled with a permeable core material to provide the same path reluctance in the core and winding regions. This type of coil configuration is particularly suitable for larger machines because as machines are made larger, magnetic saturation occurs at progressively lower current densities in the coils and results in descreased machine power densities. By using narrow coils, thus employing larger numbers of coils per disk, and by appropriately sizing the coils, saturation can be made to occur at whatever current density corresponds to the desired power density level.

The embodiment of the invention, shown in FIGURE 5, is particularly suitable for induction motor rotors. The body of the rotor 51 is composed of an electrically conductive material, and contains radially extending ferromagnetic strips 52 of the same thickness as the body 51 embedded therein and insulated along their sides to insure optimum current paths. When connected to an appropriate multiphase power source, the stator coil arrangement is such that it creates a magnetic field configuration which effectively rotates in space about the axis of the machine. This action induces currents in the conducting rotor 51 which causes the rotor to be dragged along with the rotating field, usually with a few percent slip.

The principal advantages of the constructions of the present invention reside in (1) their substantially constant reluctance characteristic, (2) their high power densities, and (3) their high power per unit weight. To cite a typical example, a 12-inch coil array diameter generator using natural cooling can produce in excess of 0.35 horsepower per cubic inch, which corresponds to a specific power of 2.5 horsepower per pound.

There are several advantages to be realized from the machines of the present invention in view of their virtually constant reluctance in the magnetic flux paths. This characteristic prevents serious distortion of alternating current voltage and current waveforms due to machine rotation, making it easier to control the waveform. The machines are therefore readily adaptable for use with power lines supplying sinusoidal voltages. The same feature permits their use as multiphase machines, a characteristic which is not shared by all disk-type machines.

It should be evident that various modifications can be made to the described embodiments without departing from the scope of the present invention.

I claim as my invention:

1. A dynamoelectric machine comprising a rotor shaft, at least one rotor disk secured to said rotor shaft, a plurality of stator disks positioned along said rotor shaft in alternating sequence with each rotor disk, each rotor disk and each stator disk including coils spaced therearound, each coil containing strips of ferromagnetic material alternating with areas of electrically conductive nonmagnetic material.

2. The machine of claim 1 in which said strips have the same width as the disk in which they are located.

3. A dynamoelectric machine comprising a rotor shaft, at least one rotor disk secured to said rotor shaft, a plurality of stator disks positioned along said rotor shaft in alternating sequence with each rotor disk, each rotor disk and each stator disk having a plurality of coils therearound, the coils in each rotor disk and each stator disk being in axial alignment with corresponding coils of other rotor disks and stator disks, respectively, each of said coils consisting of abutting convolutions of strips of magnetic and electrically conductive nonmagnetic materials, the core of each of said coils being free of windings.

4. The machine of claim 3 in which the core of each of said coils includes a magnetically permeable material.

5. The machine of claim 4 in which the mean permeability of said core in the axial direction is substantially equal to the mean permeability of the coil in the axial direction.

6. The machine of claim 3 which includes a spirally wound ribbon of ferromagnetic material disposed at each end of the stator-rotor disk pairs along said shaft and providing flux return paths for the disks.

7. The machine of claim 3 in which said coils include insulating means between convolutions of said coils.

8. The machine of claim 3 which includes means for applying direct current to said rotor coils and alternating current to the stator coils.

9. The machine of claim 3 in which said rotor coils are generally trapezoidal in shape with generally radially extending sides.

10. The machine of claim 3 in which said strips have the same width as the disk in which they are located.

References Cited

UNITED STATES PATENTS

| | | | |
|---|---|---|---|
| 3,296,475 | 1/1967 | Parker | 310—268 |
| 3,277,323 | 10/1966 | Parker | 310—268 |
| 3,239,702 | 3/1966 | Van De Graaff | 310—268 |
| 3,230,406 | 1/1966 | Henry-Baudot | 310—268 |

WARREN E. RAY, *Primary Examiner.*

R. SKUDY, *Assistant Examiner.*

U.S. Cl. X.R.

310—162, 254, 268